United States Patent
Manapragada

(10) Patent No.: US 9,191,906 B2
(45) Date of Patent: *Nov. 17, 2015

(54) METHOD AND APPARATUS FOR WIRELESS CLOCK REGENERATION

(71) Applicant: PICONGEN WIRELESS, INC., San Jose, CA (US)

(72) Inventor: Sai C. Manapragada, Sunnyvale, CA (US)

(73) Assignee: Sigma Group, Inc., Morganville, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/164,969

(22) Filed: Jan. 27, 2014

(65) Prior Publication Data

US 2014/0314066 A1 Oct. 23, 2014

Related U.S. Application Data

(63) Continuation of application No. 12/136,954, filed on Jun. 11, 2008, now Pat. No. 8,667,318.

(60) Provisional application No. 60/933,901, filed on Jun. 11, 2007, provisional application No. 60/933,905, filed on Jun. 11, 2007.

(51) Int. Cl.
| | |
|---|---|
| G06F 11/00 | (2006.01) |
| G06F 1/04 | (2006.01) |
| G06F 1/12 | (2006.01) |
| G06F 5/06 | (2006.01) |
| H04N 7/18 | (2006.01) |
| H04W 56/00 | (2009.01) |
| H04L 7/08 | (2006.01) |
| H04J 3/06 | (2006.01) |
| H04W 84/12 | (2009.01) |

(52) U.S. Cl.
CPC .............. *H04W 56/00* (2013.01); *H04L 7/08* (2013.01); *H04W 56/0055* (2013.01); *H04J 3/0644* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,145,247 | B2* | 3/2012 | Fullam | 455/502 |
| 8,233,091 | B1* | 7/2012 | Rabinowitz et al. | 348/554 |
| 2002/0174434 | A1 | 11/2002 | Lee et al. | |
| 2006/0013347 | A1* | 1/2006 | Brown et al. | 375/354 |
| 2006/0156342 | A1* | 7/2006 | Xiao | 725/50 |
| 2006/0187877 | A1 | 8/2006 | Lundby et al. | |
| 2006/0262229 | A1* | 11/2006 | Takeda et al. | 348/725 |
| 2008/0008117 | A1* | 1/2008 | Alizadeh-Shabdiz | 370/328 |
| 2010/0022243 | A1* | 1/2010 | Oommen et al. | 455/435.3 |

OTHER PUBLICATIONS

Extended European Search Report for EP2183927 (Regional stage entry of related case PCT/US2008/006182), mailed Nov. 17, 2014.

* cited by examiner

*Primary Examiner* — Nasser Goodarzi
*Assistant Examiner* — Fred Peng
(74) *Attorney, Agent, or Firm* — Robert O. Groover III; Gwendolyn S. S. Groover; Groover & Associates PLLC

(57) ABSTRACT

Methods and systems for operating a wireless clock system for multimedia datastream transmission and display. Source clock frames are compared with a reference clock frames and the clock difference are transmitted to a wireless clock receiver which also receives the same reference clock frames. Source clock frames are re-constructed using the reference clock frames, clock difference information and the receiver's local clock system.

14 Claims, 10 Drawing Sheets

METHOD AND APPARATUS FOR WIRELESS CLOCK REGENERATION

CROSS-REFERENCE TO OTHER APPLICATION

Priority is claimed from U.S. Provisional Application 60/933,905 filed on Jun. 11, 2007, and also U.S. Provisional Application 60/930,051 filed on May 14, 2007, and U.S. Provisional Application 60/933,901 filed on Jun. 11, 2007, all of which are hereby incorporated by reference. This application may be related to the present application, or may merely have some drawings and/or disclosure in common.

BACKGROUND

The present application relates to multi-media networks, more particularly, to wirelessly transmission of a clock line for multimedia data distribution. The content of the distribution includes, but not limited to, high-definition video, digital sound, satellite TV, cable TV, high speed data, games, etc.

Note that the points discussed below may reflect the hindsight gained from the disclosed inventions, and are not necessarily admitted to be prior art.

With the proliferation of high quality video, an increasing number of electronic devices, such as consumer electronic devices, utilize high definition (HD) video which can require multi-Gbps (bits per second) in bandwidth for transmission. The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals.

The introduction of consumer friendly Wi-Fi technology has let home and office users create wireless local networks and connect two or more computers wirelessly to each other and a faster Internet line. This way there is no more poking holes in walls or tripping over Ethernet cables. People can access the internet anywhere in home and in office. The Wi-Fi technology is rapidly gaining acceptance as an alternative to a wired local area network (LAN).

A Wi-Fi enabled device such as a PC, game console, cell phone, MP3 player or a PGA can connect to the internet when within range of a wireless network that is connected to the Internet. The area covered by a Wi-Fi hotspot (Access Point) can be as little as a single room with wireless-opaque walls or as much as many square miles covered by overlapping access points.

Routers which incorporate a DSL or cable modem and a Wi-Fi access point are often used in homes and other premises, and provide Internet access and inter-networking to all devices connected via wireless or by cable into them. Devices supporting Wi-Fi can also be connected in ad-hoc mode for client-to-client connections without a router.

Wi-Fi devices use unlicensed spectrum to provide access to a network, ameliorating the trouble of obtaining FCC license.

In short, Wi-Fi allows LANs to be deployed without cabling for client devices, dramatically reducing the costs of network deployment and expansion. Spaces where cables cannot be run, such as outdoor areas and historical buildings, can host wireless LANs.

However, current Wi-Fi technology has significant operational limitations as well as severe shortcomings in spectrum assignments.

A current typical Wi-Fi adapter operates at a maximum raw data rate of 54 Mbit/s, and suffers sometimes severe channel interferences and collisions.

Given that the current high definition multimedia are transmitted as 1-10 Gbit/s, the current Wi-Fi system, with 54 Mbit/s capacity, is powerless to transmit high definition video, audio and other multimedia. Although current Ultra Wide Band technology can offer up to 5 Gbit/s, its range usually is within 10 meters, and often is Line of Sight.

In most wireless communications, HD video is first compressed before transmitting to the wireless medium. Compression of the HD video is attractive because the overall required communication bandwidth and power can be significantly reduced, relative to transmission of the original, uncompressed video. However, with each compression and subsequent decompression of the video, some video information can be lost and the picture quality is degraded. Wireless transmission of HDMI video/audio is key to operate a high quality home entertainment network.

Conventional HDMI cable contains multiple wired connections for data transfer including 1 wired line for CLOCK. This wire provides the source HDMI clock from a source, such as an HD DVD player to the destination HDMI clock, such as an HDMI plasma TV. This signal is required to synchronize the data for transfer and HDMI encryption. The HDMI cable connected between the source (e. g. DVD player) and the destination (e. g. TV) provides this CLOCK line. However, for a wireless system, where the DVD player is now connected to a wireless transmitter and the TV is connected to a wireless receiver, the CLOCK line is missing.

In most wireless system, data are transmitted as data packets. The access nodes obtain the data through a common IP multicast or broadcast group over an IP multicast network. Packets for the multicast or broadcast may arrive at the access nodes with differing delays due to non-synchronous nature of IP multicast or broadcast forwarding. Packets may also be non-synchronous because packets may be lost along the multicast forwarding path.

SUMMARY

This application discloses a novel system, device, and methods for providing a wireless clock line.

In one embodiment, an HDMI source clock is transmitted to Wireless Clock Transmitter (WCT) which transmits information regarding the source clock in relation to a reference radio frequency such as Wi-Fi Beacon or a GPS signal. A Wireless Clock Receiver (WCR) receives the transmitted clock reference and the information about the source clock and sends a replicated source Clock signal to an HDMI sink. WCT and WCR periodically synchronize and re-synchronize between each other at request or automatically.

In another embodiment, the request for synchronization can come from the Wireless Clock Receiver. Depending on the preset conditions, such as jitter thresholds, reset of configuration, etc, the system also does automatic re-synchronization periodically.

In one embodiment, Wi-Fi Beacon is used as wireless reference; in another embodiment, a local GPS (Global Positioning System) is used as a wireless reference.

In one embodiment, the smallest time difference between the source clock frame and the wireless reference clock frame is calculated and transmitted to a receiver, and such difference is used to estimate source clock frame on the receiver.

In one embodiment, Subsequent Phase Tracking is done by using Phase Lock Loop, and is used to replicate the source clock frame in the receiver's local clock system. The estimated source clock frame is replicated by taking into account the initial phase difference and is replicated at the starting time of the next local clock phase.

The disclosed innovations, in various embodiments, provide one or more of at least the following advantages:

Seamless integration of the wireless media transmission system with the existing media display and cable system;

Easy clock calculation and easy data synchronization between the transmitting system and the receiving system;

Reliable and flexible;

Economical and highly efficient.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

The numerous innovative teachings of the present application will be described with particular reference to presently preferred embodiments (by way of example, and not of limitation).

High Definition (HD) signals are typically transmitted from one system to another using cables carrying DVI (Digital Video Interface) or HDMI (High Definition Multimedia Interface) signals. Conventionally, DVI/HDMI signals are conveyed using a signaling scheme known as Transition Minimized Differential Signaling (TMDS). In TMDS, video, audio, and control data are carried as a series of 24-bit words on three TMDS data channels with a separate TMDS channel for carrying clock information. Additionally, DVI/HDMI systems may include a separate bi-directional channel known as the Display Data Channel (DDC) for exchanging configuration and status information between a source and a sink, including information needed in support of High-Bandwidth Digital Content Protection (HDCP) encryption and decryption. In HDMI, an optional Consumer Electronic Control (CEC) protocol provides high-level control functions between audiovisual products.

The Picon wireless home network comprises Picon Media Server and Picon Receiver that can seamlessly and securely integrate into the conventional audio-video cable system and provides about 10× improvement in data throughput over standard Wi-Fi technology, thus enables consumers to stream high quality wireless video, digital audio and high speed data applications across multiple rooms in home and in office without the stress of cabling. In order to wirelessly transmit the multimedia information, the Picon system also provides an architecture to wirelessly transmit clock channels for data synchronization and for seamless integration into the conventional system.

A Picon system is compatible with existing wireless technology and High Definition Multimedia Interface (HDMI), IEEE 802.11, Multiple-in Multiple out (MIMO), standard Wi-Fi physical (PHY) and Media Access Control (MAC) layer, and existing IP protocols, extremely high bandwidth applications such as Voice IP (VOIP), streaming audio and video content (including high definition), multicast applications, and also supports convergent networks, and ad hoc networks.

On transmission, video, audio, and related information data signals are digitally encoded into a packetized data stream using a number of algorithms, including error protection and correction. A micro-controller may be included to control the overall operation, including selection of parameters, the set-up and control of components, channel selection, viewer access to different programming packages, blocking certain channels, packet loss prevention and other functions. The compression and de-compression of packetized data streams may be accomplished according to the Motion Picture Expert Group (MPEG) various standards and HDMI standards and specifications.

Figure 1:
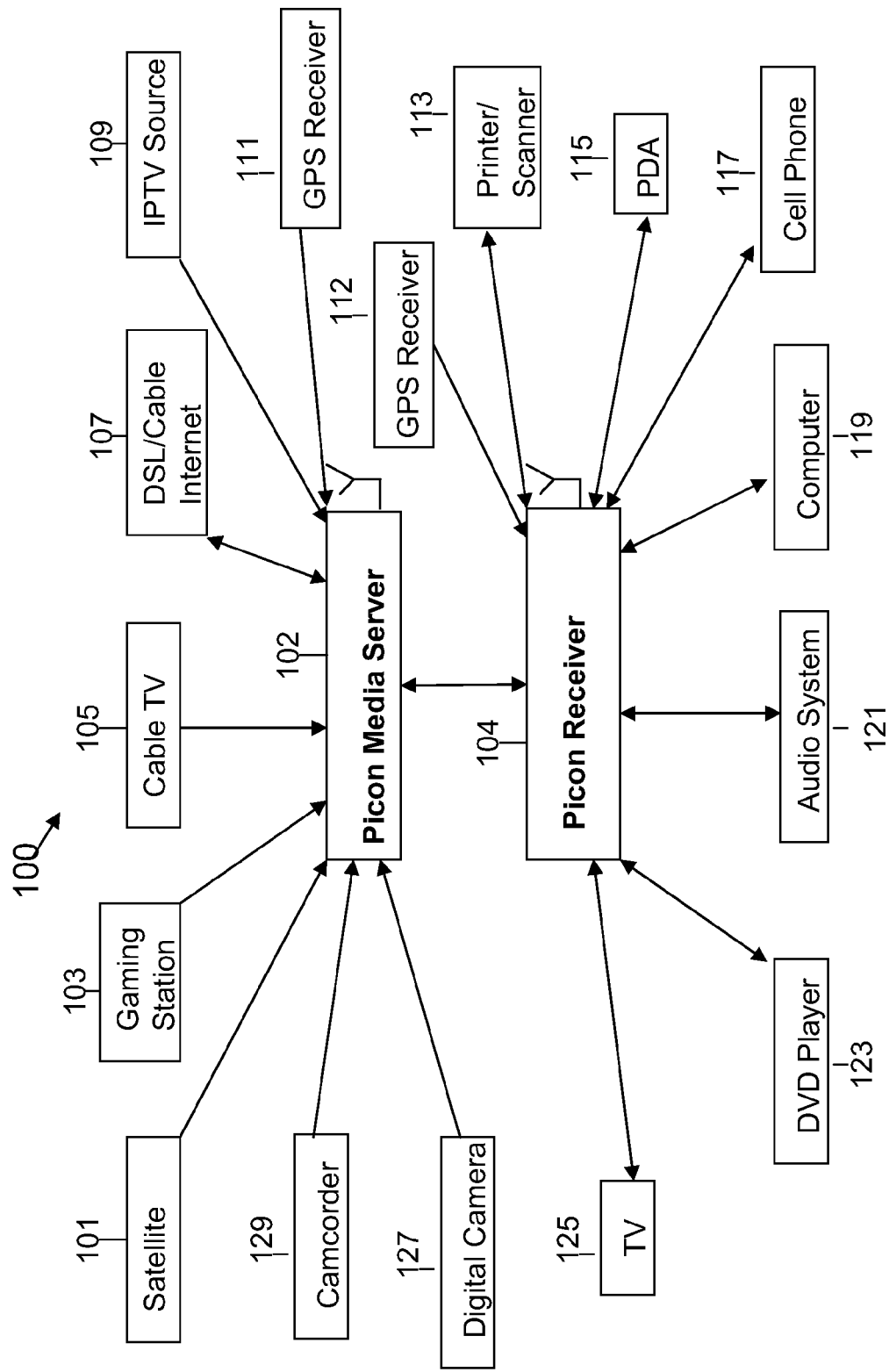
FIG. 1 schematically shows an example of Picon macronetwork.

FIG. 1 is a network diagram illustrating an example wireless communication network 100 according to an embodiment of the present disclosure. In the illustrated embodiment, the wireless network 100 comprises a plurality of devices including device 111, 113, 115, 117, 119, 121, 123, 125, 127, 129 etc. Each of the devices can be any of a variety of multimedia and/or wireless devices, including a DVD player, digital audio systems, analog or digital TV, camcorder, digital camera, printer, scanner, fax machine, copy machine, graphics processor, cell phone, personal digital assistant ("PDA"), personal computer ("PC"), laptop computer, PC card, special purpose equipment, access point, router, switch, base station controller, game machine, Wi-Fi phone, security camera, set top box, GPS, or any combination of these and other devices configured to process and handle large amount of data. The transmission of data from the access nodes to the mobile stations can be over one of a variety of wireless technologies, such as IEEE 802.11, 802.16, CDMA, OFDM, UMTS, HSDPA, etc. The networks can include CDMA, GSM, CDMA2000, W-CDMA, UMTS, WiFi, WiMAX and other known and developing networks. In the context of the invention as described below, the access nodes conform to IEEE 802.11, 802.16 and WiMAX standards.

With the aid of the Picon system, as shown in this embodiment, including Picon media server 102 and receiver 104, these media display devices, regardless of whether they were originally capable of wireless communication, will gain the capacity to communicate to other devices in the network wirelessly. These devices become not only the data receivers, but also data providers, when the communication is configured to be bi-directional. Other data sources can, as indicated by such as 101, 103, 105, 107, 109, be for any of a variety of cable TV, satellite system, gaming stations, broadband Internet, IPTVs etc., provided by outside service providers, including audio, video data, or application data or the combination thereof. Depending on the service providers, the communication with these data sources can be configured to be either uni-directional or bi-directional, that any of the above mentioned devices can send data to those service systems through the Picon media server/receiver wirelessly. The communication between the Picon media server and receiver may be configured to be bi-directional as well.

High rate digital data come into the network through wire or satellite dish, via conventional connections such as satellite set-top box 101, gaming stations 103, cable TV set-top box 105, DSL modem 107, IPTV set-top box 109 etc. The high rate digital data are transmitted to Picon Media Server 102 through wire for data processing into lower rate digital data stream. Processed data are then wirelessly transmitted to Picon Receiver 104 which is connected with individual display devices, such as, devices 111, 113, 115, 117, 119, 121, 123, 125, 127, 129. Picon Receiver 104, upon receiving the wirelessly transmitted lower rate data stream, recovers and restores the lower rate data streams into the original high rate data stream and then sends them to the respective corresponding play or display device. The wireless transmission may be based on Wi-Fi protocol (IEEE 802.11 or other protocol transmission protocols, such as Third Generation Partnership Project (3GPP) 2G and 3G Code Division Multiple Access (CDMA) technologies, using IP or IP secure protocols.

In the illustrated embodiment, the network 100 could be any of a variety of network types and topologies and employ any of a variety of types of protocols. For the sake of providing a straightforward description, the illustrated embodiment will be described as an IEEE 802.11 compliant.

In one embodiment, the high data rate content streams from one or more data sources can either be encrypted or unencrypted; compressed or uncompressed. Before directly passing the data stream for processing, the Picon media server 102 can include other switches and routers to direct the input data steams to the correct processing port.

Figure 2:
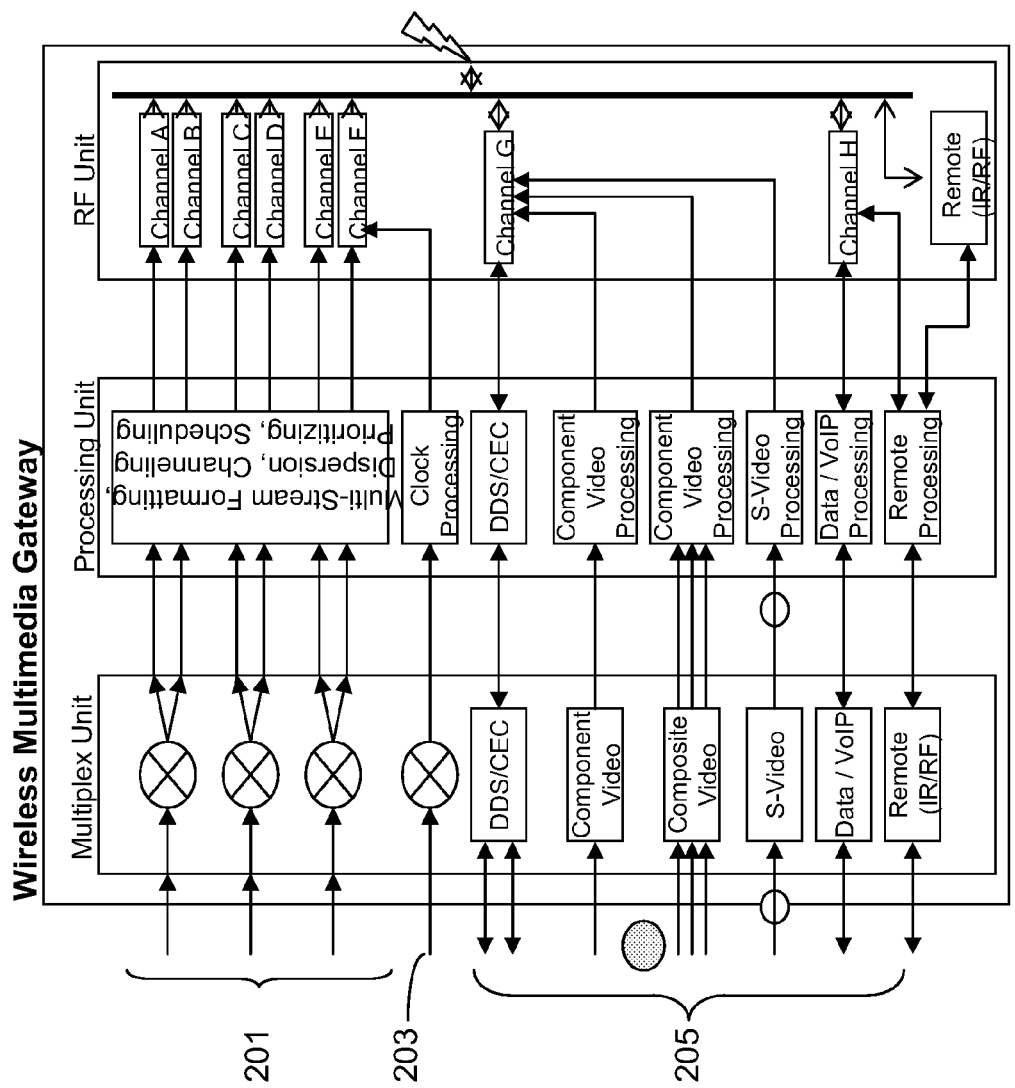
FIG. 2 depicts an example architecture of a Picon wireless multimedia gateway.

FIG. 2 shows an example of transmitting of a wireless clock line in a Picon Wireless Multimedia Gateway. The PHY layer of a Picon transmitter includes one or more Wireless Multimedia Gateways that comprises both multi-streaming and multi-channeling mechanism. Multi-streaming mechanism comprises plurality of parallel Wi-Fi like multiplexing units which splits a single datastream into plurality of low rate (LR) bitstreams and distributes them among plurality of channels. The splitting of the original high rate data stream 201, for example of a high definition video, can be implemented using the Multiple-input and multiple-output (MIMO) technology as specified in IEEE 802.11n. For multi-channeling mechanism (205), each data type is processed by data-type specific processing unit, such as processing unit for DDC/CEC processing, composite video processing, component video processing, S-video processing, data/VoIP processing, etc.; and each of the sub-streams can be further processed in parallel in a processing unit that formats the sub-streams into packets with header information for the receiver(s) and be transmitted through one or more antennas in parallel. The number of antennas and the use of a specific antenna may be dynamically controlled by a controlling module that disperses, prioritizes, and schedules the transmission of each sub-stream.

A wireless clock line is transmitted as 203 for periodical data synchronization.

Figure 3:
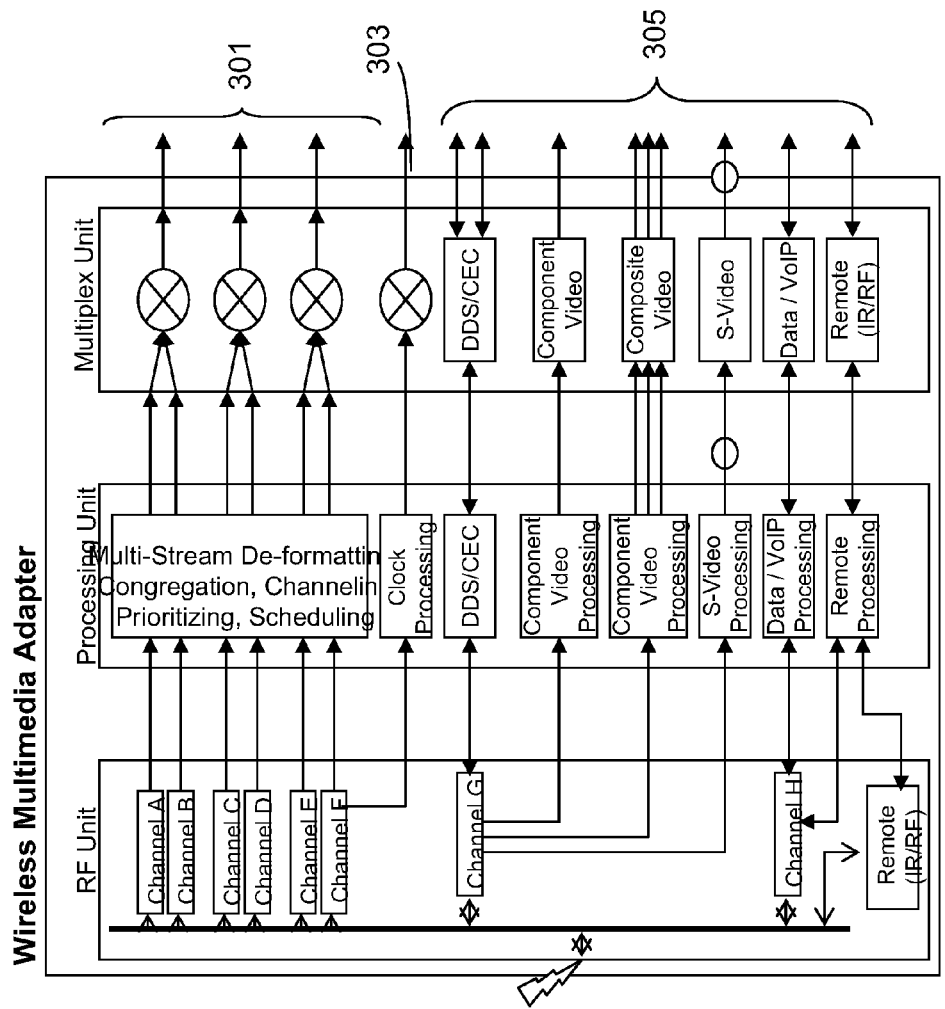
FIG. 3 depicts an example architecture of a Picon wireless multimedia adapter.

FIG. 3 shows an example of receiving of a clock line in a Picon Wireless Multimedia Adapter. The PHY layer of a Picon receiver includes one or more Wireless Multimedia Adapters that comprises multiple parallel Wi-Fi adapter-like units 301 which can further have more than two low-rate receiving channels, each of which are linked to one or multiple antennas to receive data packets originally transmitted from HDMI source or other high data rate sources, and receiving channels for ordinarily compressed data. Each of the received sub-streams of packets is further processed in a processing unit that de-formats the packets and checks for errors based on the header information. Such sub-streams of packets, depending the required criteria, may be further congregated in a multiplex converter to be outputted at high data rate (301), or can be outputted to the sink at a modified or a similar or the same data rate (305) as that of the original data streams.

A wireless clock line is received on a channel separate from other channels or on the same channels as the data channels and are processed and separately sent to a destination (303).

The Pico receiver can connect to devices using various external or internal interconnects such as PCI, miniPCI, USB, Cardbus and PC Card, or cable or digital TV connectors. The output data of a Picon receiver can be directly sent to a display device. For the signals that are originally analog, the output digital data may first be converted into analog signal by a digital to analog converter before sending to a display device.

In one embodiment, the application layer of the Picon transmitter includes a pre-processing module and a control module. The pre-processing module can perform pre-processing of the audio/video such as partitioning of encrypted and compressed data. The control module provides a standard way to exchange data stream information. Before a connection begins, the control module negotiates the data formats to be used, and when the need for the connection is completed, the control commands are used to stop the connection.

The transmission and receiving of the wireless signals are controlled by the control module which dynamically allocates channels based on performance statistics. In one embodiment, it monitors and analyzes the performance of each channel and allocates the channels dynamically based on their performances as well as the configuration criteria. For example, if one of the channels shows degradation in performance, that channel will be replaced with a more robust channel to avoid further packet losses. This way, the packets are first stored in a frame buffer and they are scheduled and classified dynamically before they are transmitted.

The control module dynamically maps communication channels and timeslots in a network so that multiple channels can be reused simultaneously throughout the network during the same timeslot in a fashion that does not create collisions.

For example, the Picon media server serving as a central server first determines the network topology of its wireless communication network in order to identify its client nodes or client devices and the discrete link a node or client has. Timeslots for transmission of packets between server and a particular node device are then identified and a separate channel is assigned. The various timeslots and communication channels are dynamically mapped across the network to maximize throughput and then queued up packets are transmitted over the various channels during the various timeslots in accordance with the dynamically changing mapping. The dynamically changing mapping allows maximum flexibility for spikes in throughput by individual nodes and also accounts for efficient ingress and egress of nodes in the wireless network.

Figure 4:
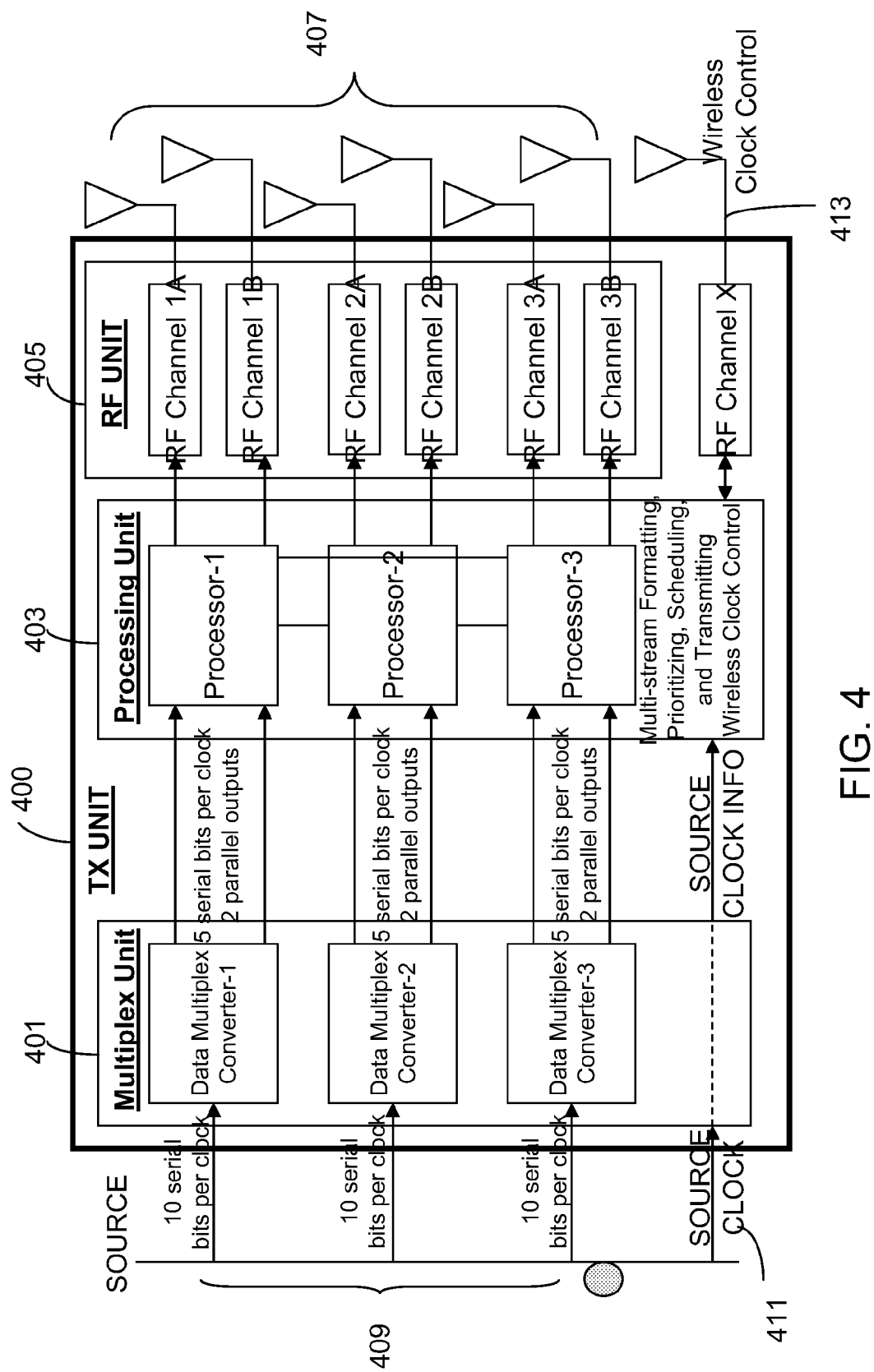
FIG. 4 depicts an example clock channel in a multi-streaming transmitting unit in a Picon system.

For an HDMI video stream, as shown in FIG. 4, the control module directs the data stream to the correct processing module 400 for multiplexing and multi-streaming. A single input datastream is split into plurality of sub-streams (409) by distributing the datastream on plurality of parallel processing units, which are further processed and packed for proper transmission (units 401 and 403), and are transmitted by application layer and PHY layer via multiple-channels. In the mean time, a wireless source clock and reference are processed and transmitted (411 and 413).

Figure 5:
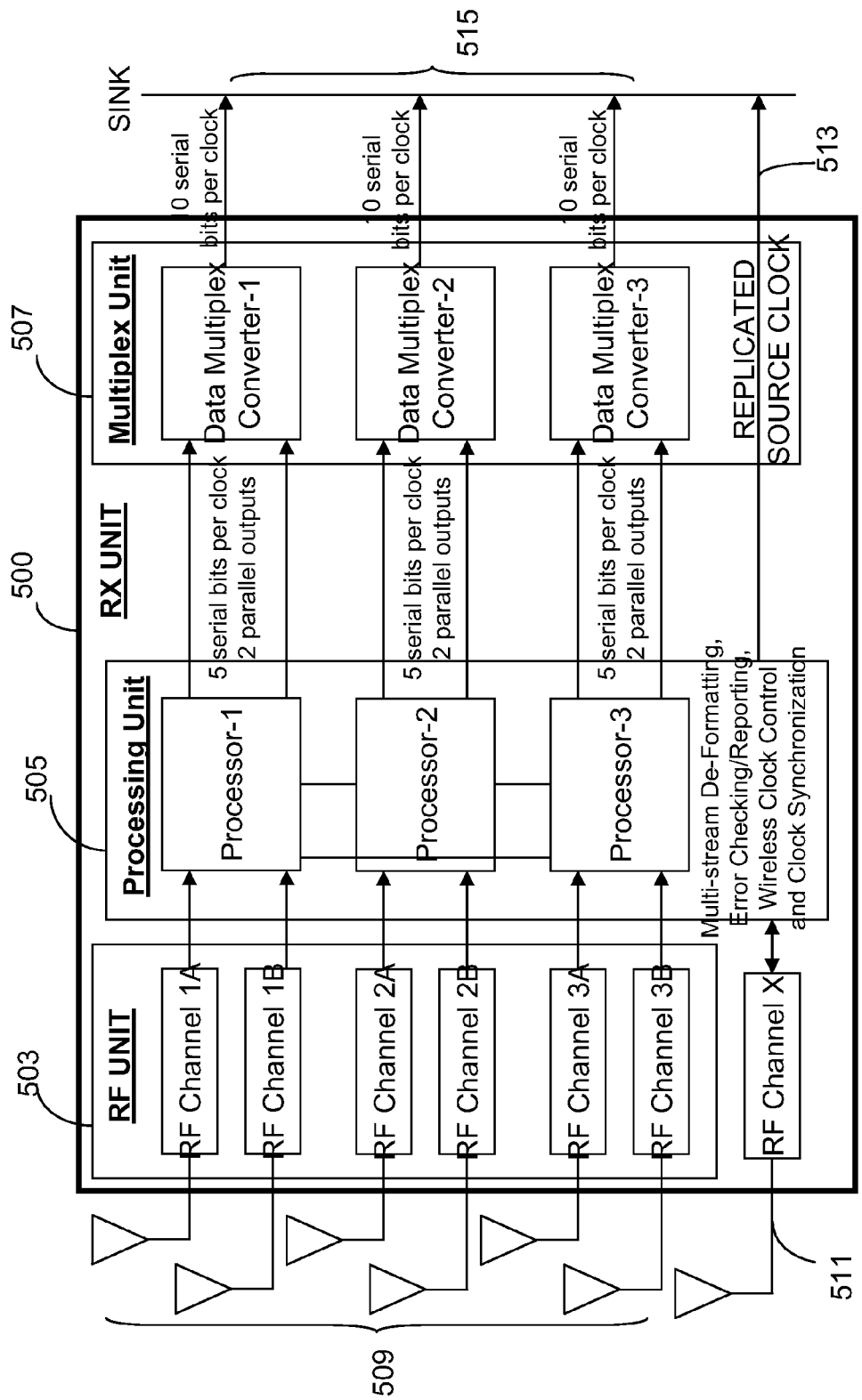
FIG. 5 depicts an example clock channel in a multi-streaming receiving unit in a Picon system.

In FIG. 5, the Picon receiver 500 receives the wireless transmitted digital signals 509 from the transmitter by multiple antennas and channels 503 and conducts the reverse-processing to re-assemble signals received through its multiple channels to a single stream shown as 515 and to the original format or according to the configuration by processing unit 505 and multiplex unit 507. The mechanism of packet loss prevention is applied by dynamic channel assignment during the transmission to improve performance and efficiency. Although separate channels and antennas may not be required for clock information transmission, in FIG. 5, channel X and antenna 511 are dedicated to receive the wirelessly transmitted source clock and reference clock information which are further processed and synchronized before being sent to a destination sink (513).

One embodiment of the structure of a Picon processing layer can further contain an add/drop multiplexer module which dynamically communicates with the FHY layer of fiber backhaul and the control unit and router unit; the control unit communicates with multiplexer, router/buffer/firewall/QoS and also the transceivers which includes encryption processor, Wi-Fi like chipset and set of radio frequency components and antennas.

Transition Minimized Differential Signaling (TMDS) protocol can be used for signal integration and congregation of the packets. In TMDS, video, audio, and control data are carried as a series of 24-bit words on three TMDS data channels with a separate TMDS channel for carrying clock information. Additionally, DVI/HDMI systems may include a separate bi-directional channel known as the Display Data Channel (DDC) for exchanging configuration and status information between a source and a sink, including information needed in support of High-Bandwidth Digital Content Protection (HDCP) encryption and decryption. In HDMI, an optional Consumer Electronic Control (CEC) protocol provides high-level control functions between audiovisual products.

Wireless Clock Synchronization Mechanism

In a Picon system, the source HDMI clock is first obtained from a HDMI source, for example, a DVD player, by the transmitter. The transmitter then acts as a "proxy" for the destination, for example, a TV. So as far as the DVD player is concerned, it "thinks" it is indeed connected to the TV. Similarly on the receiver end, the receiver acts as the "proxy" for the source (DVD player). So as far as the TV is concerned, it "thinks" it is connected to the DVD player. So, the CLOCK information is obtained from the DVD player by the transmitter, and the TV can obtain the CLOCK information from the receiver. Since different receivers may receive the source information at a different time due to difference in distance and difference in processing time, to regenerate the original CLOCK information, in other words to synchronize the transmitter clock with the receiver clock, a reference CLOCK which is available at both the transmitter and the receiver is needed.

In a wireless communication system, a wireless host periodically transmits a beacon frame over one or more radio frequency (RF) channels. Each beacon frame provides information about the host, including a service set identifier to identify a specific wireless network, a carrier frequency, and the beacon interval, which specifies the amount of time between beacon transmissions. A wireless device that receives a beacon frame can use the information in the beacon frame to determine whether to associate with the host.

Figure 6:
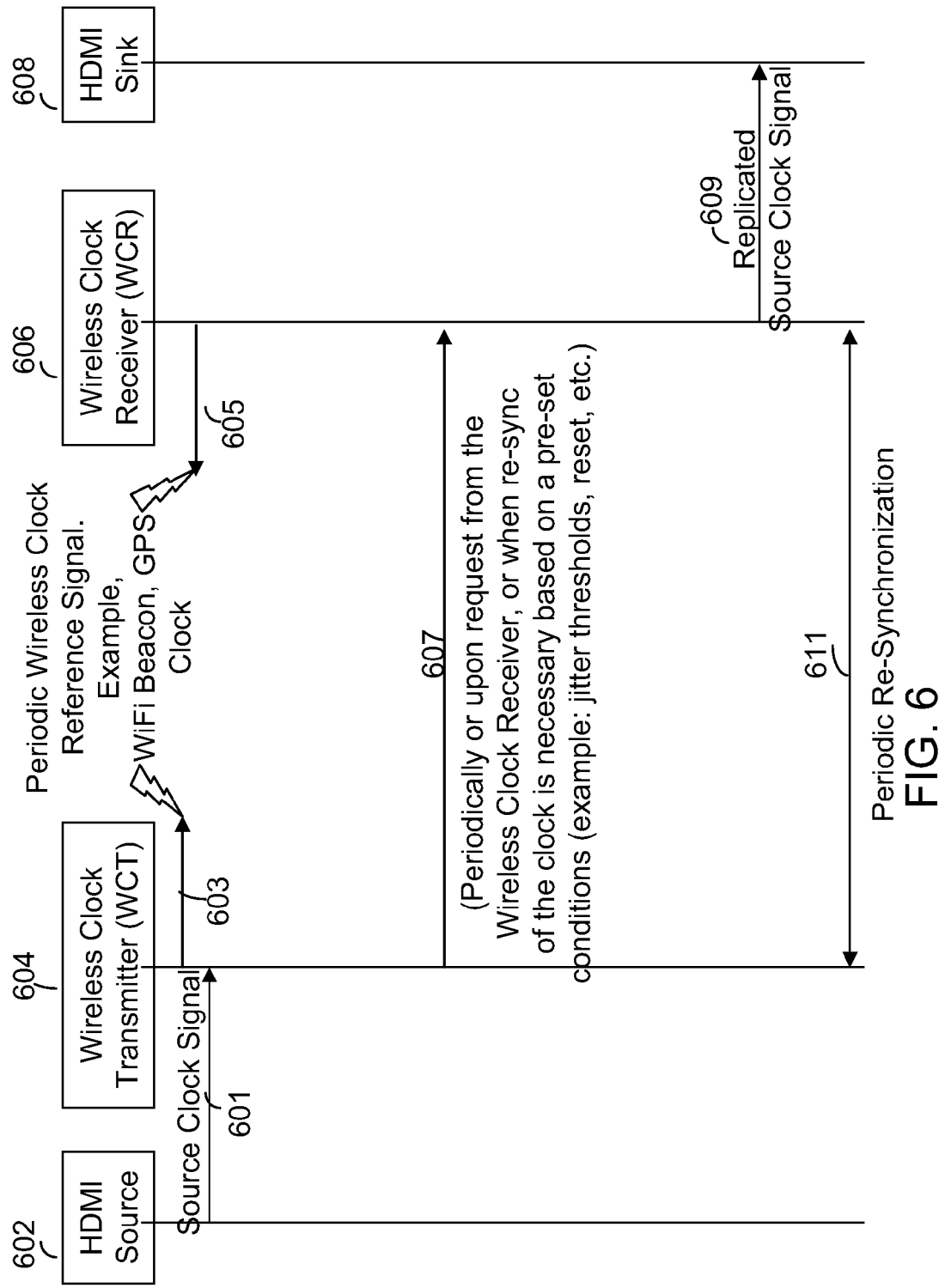
FIG. 6 shows an example functional process of a wireless clock control system.

FIG. 6 depicts the general process for transmitting a CLOCK reference. An HDMI source clock 602 is transmitted (step 601) to Wireless Clock Transmitter (WCT) 604, which transmits information regarding the source clock in relation to a reference radio frequency such as Wi-Fi Beacon or a GPS signal (step 603). Wireless Clock Receiver (WCR) 606 receives the transmitted clock reference and information about the source clock (at step 605) and sends a replicated source Clock signal to HDMI sink 608. WCT and WCR periodically synchronize (step 607) and re-synchronize (step 611) between each other. The request for synchronization can come from the Wireless Clock Receiver. Depending on the preset conditions, such as jitter thresholds, reset of configuration, etc, the system also does automatic re-synchronization (step 611). A replicated source clock signal based on the local clock information is sent to a destination sink (step 609)

Figure 7:
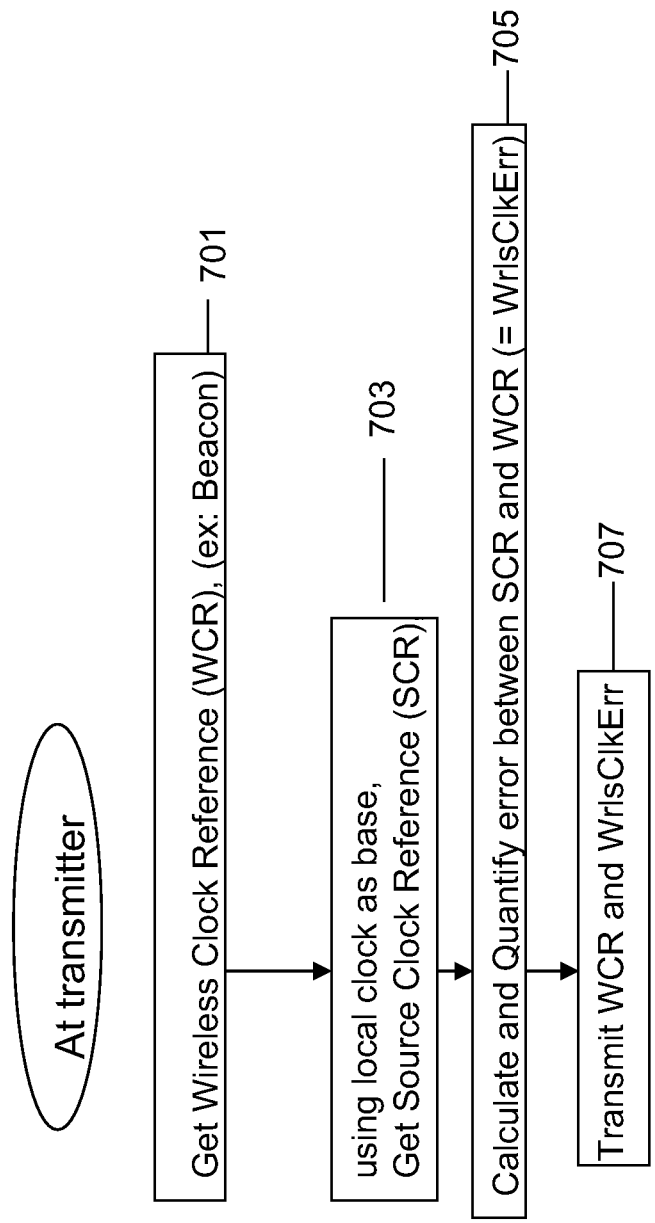
FIG. 7 shows a working process of a wireless clock control transmitter.
Figure 8:
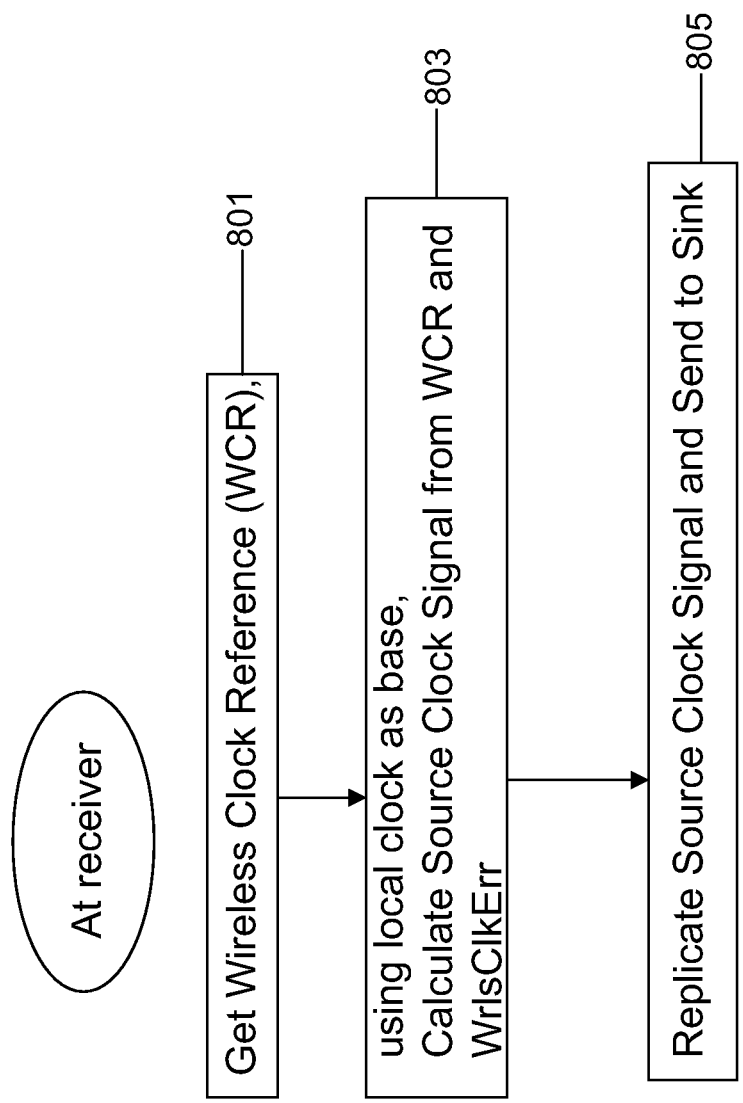
FIG. 8 shows a working process of a wireless clock control receiver.

FIGS. 7 and 8 show an example process of how the clock reference is transmitted in accordance with this disclosure. The clock transmitter first obtains a wireless clock reference (WCR), such as Wi-Fi beacon or local GPS clock (step 701). The transmitter then uses its local clock as a base, obtains the source clock reference (SCR) (step 703). After calculating the clock difference (WrlsClkErr) between the SCR and the WCR (step 705), the transmitter transmits the WrlsClkErr and the WCR to the receiver (step 707).

At the receiver side, shown in FIG. 8, the receiver receives the WCR and the WrlsClkErr (step 801) and calculates the SCR using WCR and WrlsClkErr (step 803) and Using its local clock as the base (step 805), the receiver replicates the SCR by adding the local clock phase and sends the replicated SCR to the sink (step 805).

Figure 9:
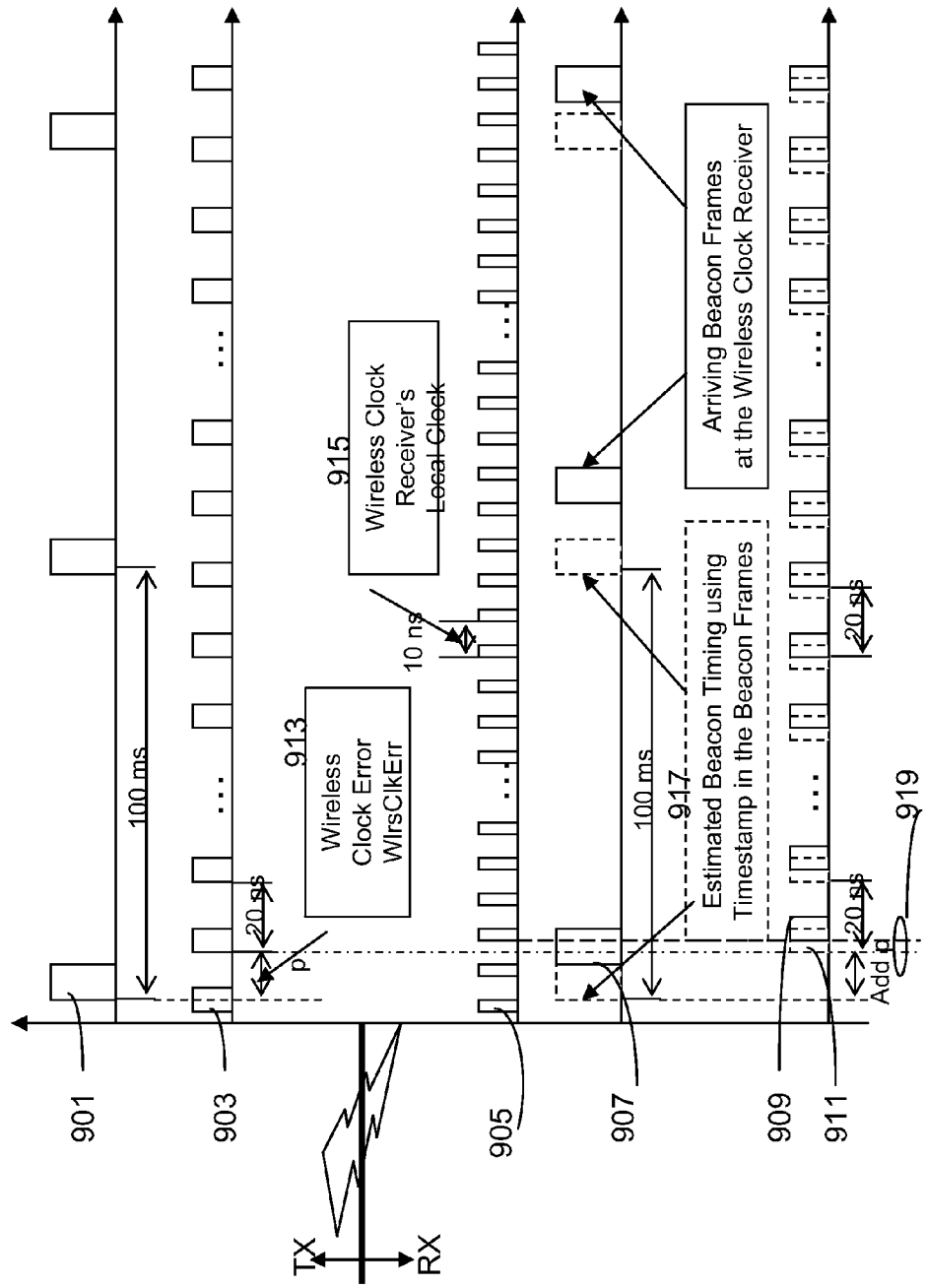
FIG. 9 shows an operation process for transceiving a wireless clock control to a sink using Wi-Fi beacon clock frame.

FIG. 9 shows an example of using Wi-Fi beacon as the wireless clock reference (WCR) in transmitting and receiving a source clock line. In the figure, assuming the Wi-Fi beacon 901 is transmitted at 10 kHz and the HDMI source clock 903 is transmitted at 50 mHz, the closest clock error (WlrsClkErr) between 901 and 903 is then calculated as p (913) which is transmitted to a receiver by the wireless clock transmitter.

At the receiver, the Wi-Fi beacon clock frames arrive as 907 and the WlrsClkErr value p is also received. Using the timestamp in the clock frames and the arrived 907, the original Wi-Fi beacon frames are estimated as 917. The source clock reference (SCR) frames 911 are then estimated using source clock frequency information and by adding p to the estimated Wi-Fi beacon 917 clock frames. Using receiver's local clock frames 905 as base, Initial Phase Difference 919 is calculated (and recalculated during re-synchronization) which is done by using Subsequent Phase Tracking via using Phase Lock Loop. The estimated SCR 911 frames are then replicated by taking into account the initial phase difference 919 and are replicated at the starting time of the next local clock phase by shifting the start of the SCR clock frames with Initial Phase Difference 919. The replicated SCR 909 clock frames are then sent to a destination sink.

Figure 10:
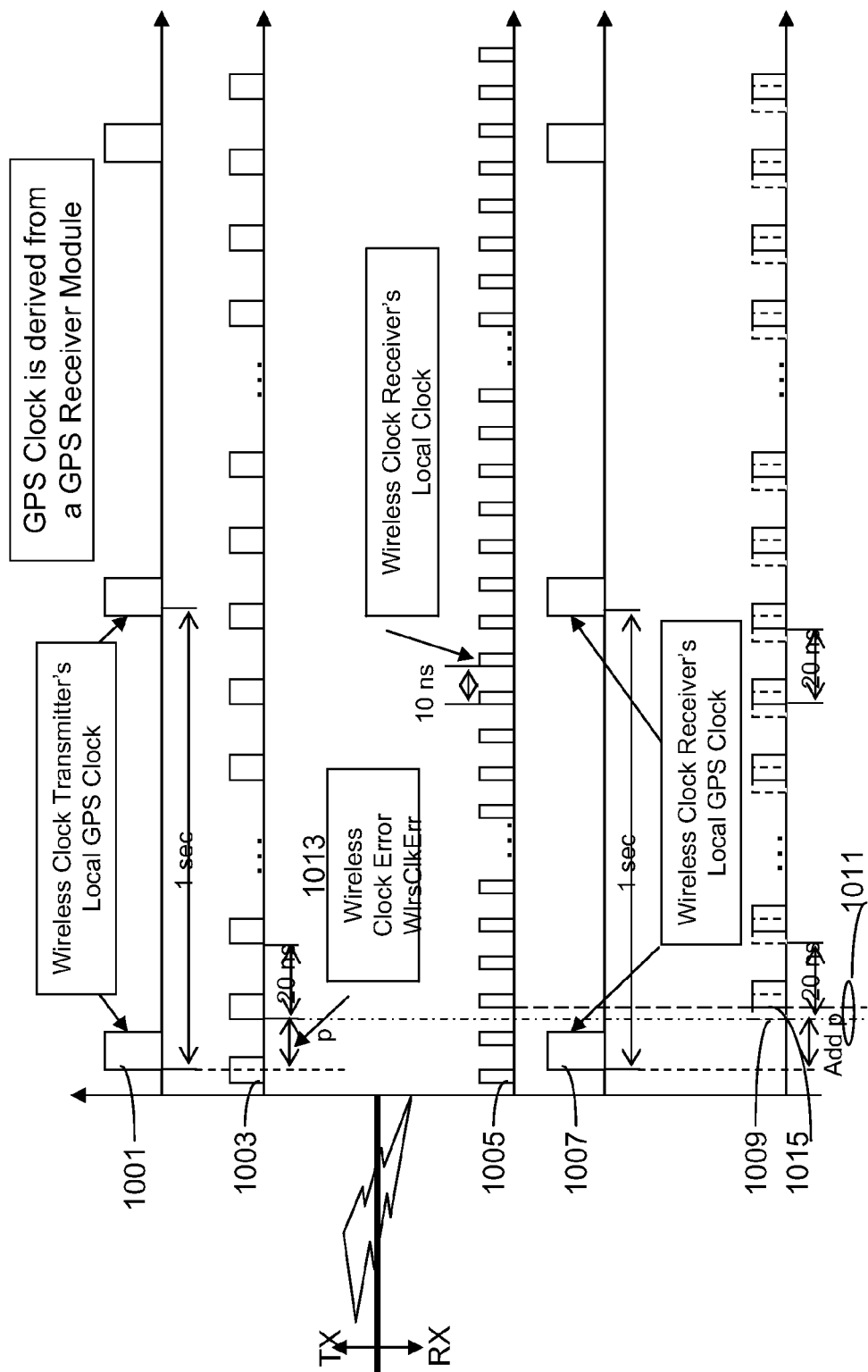
FIG. 10 shows an operation process for transceiving a wireless clock control to a sink using local GPS clock frame.

FIG. 10 shows an example of using GPS as the wireless clock reference (WCR) where the GPS clock frames are derived from the local GPS receiver module. The derived GPS clock frames 1001 at the transmitter side are used to calculate the clock error WlrsClkErr p (1013) between the HDMI source clock frames 1003 and the GPS clock frames 1001. The closest clock error p between 1001 and 1003 is transmitted to a receiver.

At the receiver side, the GPS clock frames 1007 are received and derived in the same way as 1001 from the local GPS receiver module. Then, the source clock reference (SCR) clock frames 1009 are estimated using source clock frequency information and by adding WlrsClkErr value p to GPS Clock frames 1007. Using receiver's local clock frames 1005 as the base, and the Initial Phase Difference 1011 is calculated (and recalculated in re-synchronization) which is done by using Subsequent Phase Tracking via using Phase Lock Loop. The estimated SCR 1009 is then replicated by taking into account the initial phase difference 1011 with the local clock frames and is replicated at the starting of the next local clock phase by shifting the start of the SCR clock frames with Initial Phase Difference 919. Replicated SCR 1015 frames are then sent to a destination sink.

In a wired connection, the Source Clock Signal is sent to the Sink when the data (10 bits in HDMI for example) is ready to be clocked out to the Sink. In case of the wireless connection, the transmission of data to the Sink from the Wireless Clock Receiver is adjusted based on the time at which the Replicated Source Clock Signal is sent to the Sink. So instead of sending the clock when data is ready, the data is made ready when the clock occurs. There may or may not be a periodic transmission from the WCR to the Sink.

In one embodiment of the invention, the program is stored on a computer accessible storage medium at a transmitter which is a part of or attached to a station, for example, a device coordinator or devices as shown in FIG. 1. In another embodiment, the program can be stored in other system locations so long as it can perform the transmitting procedure according to embodiments of the invention. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

In another embodiment, at least one of the device coordinator and devices comprises a processor configured to or programmed to perform the transmitting procedure. The program may be stored in the processor or a memory of the coordinator and/or the devices. In various embodiments, the processor may have a configuration based on Intel Corporation's family of microprocessors, such as the Pentium family and Microsoft Corporation's Windows operating systems such as Windows 95, Windows 98, Windows 2000 or Windows NT. In one embodiment, the processor is implemented with a variety of computer platforms using a single chip or multi-chip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like. In another embodiment, the transmitting procedure can be implemented with an embedded software. Depending on the embodiments, additional states may be added, others removed, or the order of the states changes.

According to various embodiments, there is provided: a method for synchronizing wireless data, comprising actions of: receiving first source clock frames of a datastream and receiving and deriving local Global Positioning System (GPS) clock frames by a transmitter; calculating the clock difference between said GPS clock frames and said first source clock frames; and transmitting said clock difference wirelessly; and further comprising: receiving and deriving said GPS clock frame information by a receiver; actions of: receiving said clock difference by the receiver; and constructing second source clock frames using said received clock difference and said GPS clock frames; actions of: calculating an Initial Phase Difference between the local clock frames of the receiver and said second source clock frame; constructing third source clock frames using said Initial Phase Difference and said second source clock frames; and sending said third source clock frames to a destination player; actions of: synchronizing said third source clock frames with said first source clock frames periodically; actions of: synchronizing said third source clock frames with said first source clock frames at request; actions of: synchronizing said third source clock frames with said first source clock frames automatically when a pre-set jitter threshold is reached.

According to various embodiments, there is provided: a method for wirelessly transmitting HDMI datastream, comprising actions of: multiplexing a HDMI datastream into plurality of channels of data substreams; obtaining first source clock frames of said HDMI datastream; calculating the clock difference between said source clock frames and local GPS clock frames received and derived by a transmitter; and transmitting wirelessly said data substreams and said clock difference to a receiver.

According to various embodiments, there is provided: a wireless transmitter, comprising: a processing unit which in operation respectively receives first source clock frames of a datastream and receives and derives local GPS clock frames; calculates the clock difference between said GPS clock frames and said first source clock frames; and a radio frequency unit which transmits said clock difference; wherein said processing unit further in operation processes said datastream into plurality of channels of data packets; and dynamically allocates transmitting channels for said data packets for wireless transmitting; wherein said data packets are IP data packets; wherein said radio frequency unit complies with IEEE 802.11n standards; wherein said radio frequency unit is implemented in accordance with the 3GPP standards; wherein said datastream includes one or the combination of high definition video streams, high definition audio streams, digital video signals, digital gaming data, internet content, IPTV signals, and satellite signals.

According to various embodiments, there is provided: a wireless receiver, comprising: a radio frequency unit which in operation receives and derives local GPS clock frames and also receives the clock difference between first source clock frames of a datastream and said GPS clock frames, transmitted from a wireless transmitter; and a processing unit which in operation constructs second source clock frames using said clock difference and said GPS; wherein said processing unit further in operation calculates an Initial Phase Difference between the local clock frames of the receiver and said first source clock frames; constructs third source clock frames using said second source clock frames and said Initial Phase Difference; and sends said third source clock frames to a destination player; wherein said processing unit further in operation synchronizes said third source clock frames with said first source clock frames from a transmitter periodically; wherein said processing unit further in operation processes received datasteams, and makes them ready for output before sending said third source clock frames to the player.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

It is contemplated and considered that the implementation of the processing units and transmission of wireless signals comply with any existing standards and protocols. For example, not only the IEEE 802.11n, but also other IEEE 802.11 series; the 2G/3G standards and protocols; Multimedia encoding and decoding comply with HDMI and ISO/IEC MPEG-1 and MPEG-2, MPEG-4 standards, high definition DVD (HD-DVD) standard and multimedia messaging service (MMS standard from 3GPP); the ITU-T H.261/3/4 standards; Audio Video Standard (AVS) in China.

The control system may be designed as a personal device, communicates via the cellular communication system.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A wireless transmitter, comprising:
a processor which receives first source clock frames of a datastream and receives and derives local GPS clock frames, and which calculates the clock difference between said GPS clock frames and said first source clock frames; and
a radio-frequency transmitter which transmits said clock difference;
wherein said processor processes said datastream into a plurality of channels of data packets, and dynamically allocates transmitting channels for said data packets for wireless transmitting.

2. The wireless transmitter of claim 1, wherein said data packets are IP data packets.

3. The wireless transmitter of claim 1, wherein said radio-frequency transmitter complies with IEEE 802.11n standards.

4. The wireless transmitter of claim 1, wherein said radio-frequency transmitter is implemented in accordance with the 3GPP standards.

5. The wireless transmitter of claim 1, wherein said datastream includes one or the combination of high definition video streams, high definition audio streams, digital video signals, digital gaming data, internet content, IPTV signals, and satellite signals.

6. A wireless receiver, comprising:
a radio-frequency receiver which receives and derives local GPS clock frames and also receives the clock difference between first source clock frames of a datastream and said GPS clock frames, from a wireless transmitter; and
a processor which constructs second source clock frames using said clock difference and said GPS;
wherein said processor further calculates an Initial Phase Difference between the local clock frames of the receiver and said first source clock frames; constructs third source clock frames using said second source clock frames and said Initial Phase Difference; and sends said third source clock frames to a destination player.

7. The wireless receiver of claim 6, wherein said processor periodically synchronizes said third source clock frames with said first source clock frames.

8. The wireless receiver of claim 6, wherein said processor processes received datastreams, and makes them ready for output before sending said third source clock frames to the player.

9. A wireless system for wirelessly transmitting a digital datastream, comprising:
a wireless transmitter which includes
a first processor which splits a digital datastream into a plurality of channels of data substreams, obtains first source clock frames of said digital datastream, derives local GPS clock frames, and calculates the clock difference between said first source clock frames and said GPS clock frames; and
a radio-frequency transmitter which wirelessly transmits said data substreams and said clock difference to a receiver;
a wireless receiver which includes
a radio-frequency receiver which receives and derives said GPS clock frames and receives said clock difference; and
a second processor which constructs second source clock frames using said clock difference and said GPS clock frames.

10. The wireless system of claim 9, wherein said second processor calculates an Initial Phase Difference between the local clock frames of the receiver and said second source clock frames, constructs third source clock frames using said Initial Phase Difference and said local clock frames, makes said datastream ready for output before said third source clock frames start and outputs said datastream and said third source clock frames simultaneously to a player.

11. The wireless system of claim 9, wherein said datastream includes one or the combination of high definition video streams, high definition audio streams, digital video signals, digital gaming data, internet content, IPTV signals, and satellite signals.

12. The wireless system of claim 9, wherein said second processor periodically synchronizes said third source clock frames with said first source clock frames.

13. The wireless system of claim 9, wherein said second processor synchronizes said third source clock frames with said first source clock frames at request.

14. The wireless system of claim 9, wherein said second processor synchronizes said third source clock frames with said first source clock frames automatically when a preset jitter threshold is reached.

* * * * *